(12) United States Patent
Kang et al.

(10) Patent No.: US 12,524,891 B2
(45) Date of Patent: Jan. 13, 2026

(54) METHOD FOR PROCESSING KEY POINTS IN IMAGE AND RELATED APPARATUS

(71) Applicant: Tencent Technology (Shenzhen) Company Limited, Guangdong (CN)

(72) Inventors: Yang Kang, Guangdong (CN); Chong Sun, Guangdong (CN); Canmiao Fu, Guangdong (CN); Chen Li, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 343 days.

(21) Appl. No.: 18/205,680

(22) Filed: Jun. 5, 2023

(65) Prior Publication Data

US 2023/0316548 A1  Oct. 5, 2023

Related U.S. Application Data

(63) Continuation of application No. PCT/CN2022/135051, filed on Nov. 29, 2022.

(30) Foreign Application Priority Data

Feb. 10, 2022  (CN) .......................... 202210126405.4

(51) Int. Cl.
G06T 7/269 (2017.01)
G06T 7/246 (2017.01)
G06T 7/73 (2017.01)

(52) U.S. Cl.
CPC .............. G06T 7/269 (2017.01); G06T 7/248 (2017.01); G06T 7/74 (2017.01)

(58) Field of Classification Search
CPC ............ G06T 7/269; G06T 7/74; G06T 7/248
See application file for complete search history.

(56) References Cited

U.S. PATENT DOCUMENTS

2018/0359420 A1* 12/2018 Kuchnio ............ H04N 23/6811
2021/0133580 A1*  5/2021 Mehl ........................ G06N 5/01

FOREIGN PATENT DOCUMENTS

CA    3179609 A1 * 11/2021 ............... G06T 7/74
CN   109583391       4/2019
(Continued)

OTHER PUBLICATIONS

International Search Report issued Feb. 13, 2023 in International (PCT) Application No. PCT/CN2022/135051.
(Continued)

*Primary Examiner* — Pinalben Patel
(74) *Attorney, Agent, or Firm* — Crowell & Moring LLP

(57) ABSTRACT

A method and apparatus for processing key points in an image are provided. The method includes: obtaining a first image region to which key points belongs from an $(N-1)^{th}$ frame image; obtaining a second image region to which the key points belong from an $N^{th}$ frame image; analyzing optical flow of the key points between the first image region and the second image region, to determine position offset information of the key points; compensating first predicted position information of the key points in the $(N-1)^{th}$ frame image by using the position offset information to obtain compensated predicted position information of the key points; and performing temporal smoothing on second predicted position information of the key points in the $N^{th}$ frame image using the compensated predicted position information to obtain smoothed predicted position information of the key points in the $N^{th}$ frame image.

20 Claims, 5 Drawing Sheets

(56) References Cited

FOREIGN PATENT DOCUMENTS

| CN | 109583391 | A | * | 4/2019 | ............. G06V 20/42 |
|----|-----------|---|---|--------|--------------------------|
| CN | 111047526 | A |   | 4/2020 |                          |
| CN | 113436226 |   |   | 9/2021 |                          |
| CN | 113887547 |   |   | 1/2022 |                          |
| CN | 115660983 | A | * | 1/2023 |                          |
| JP | H11508099 | A | * | 7/1999 | ............. G06T 7/248 |

OTHER PUBLICATIONS

Chinese-language Office Action issued in Chinese Application No. 202210126405.4 dated Aug. 3, 2025, with English translation (14 pages).

\* cited by examiner

METHOD FOR PROCESSING KEY POINTS IN IMAGE AND RELATED APPARATUS

RELATED APPLICATION

This application is a continuation application of PCT Patent Application No. PCT/CN2022/135051, filed on Nov. 29, 2022, which claims priority to Chinese Patent Application No. 202210126405.4, entitled "METHOD FOR PROCESSING KEY POINTS IN IMAGE AND RELATED APPARATUS" and filed with the China National Intellectual Property Administration on Feb. 10, 2022, wherein the content of the above-referenced applications is incorporated herein by reference in its entirety.

FIELD OF THE TECHNOLOGY

This application relates to the field of data processing, and in particular, to a method for processing key points in an image and a related apparatus.

BACKGROUND OF THE DISCLOSURE

With the rapid development of video technologies, the stability of key points in consecutive images in a video is particularly important. For example, when an augmented reality (AR) technology is applied to a video, the stability of key points in consecutive images affects the aesthetics and authenticity of AR presentation.

In the related art, predicted position information of key points in images is generally outputted by a deep learning model, but the deep learning model does not consider the temporality of the images during training, resulting in a jitter of the key points in the outputted consecutive images. In order to stabilize the key points in the outputted consecutive images, the predicted position information of the key points in the previous frame image is usually used to perform temporal smoothing on the predicted position information of the key points in the current frame image.

However, when the weight of the predicted position information of the key points in the previous frame image is large in the temporal smoothing method, the predicted position information after the temporal smoothing tends to be the predicted position information of the key points in the previous frame image, resulting in a delay of the key points in the consecutive images; on the contrary, when the weight of the predicted position information of the key points in the previous frame image is small, the predicted position information after the temporal smoothing tends to the predicted position information of the key points in the current frame image, resulting in a jitter of the key points in the consecutive images. Therefore, the temporal smoothing method has a poor smoothing effect on the key points in the consecutive images, and is not suitable for scenarios in which the stability of the key points in the consecutive images is highly required.

SUMMARY

In order to address the technical problem above, this disclosure provides a method for processing key points in an image and a related apparatus, which can effectively avoid a delay or jitter of key points in consecutive images, thereby improving the smoothing effect of the key points in the consecutive images to adapt to scenarios in which the stability of the key points in the consecutive images is highly required.

Embodiments of this disclosure disclose the following technical solutions:

According to one aspect, this disclosure provides a method for processing key points in an image, the method including:

obtaining a first image region to which key points belong in an $(N-1)^{th}$ frame image, N being an integer greater than or equal to 2;

obtaining a second image region to which the key points belong in an $N^{th}$ frame image, a second position of the second image region in the $N^{th}$ frame image corresponding to a first position of the first image region in the $(N-1)^{th}$ frame image;

performing optical flow processing on the key points according to the first image region and the second image region to determine position offset information of the key points;

compensating first predicted position information of the key points in the $(N-1)^{th}$ frame image using the position offset information to obtain compensated predicted position information of the key points in the $(N-1)^{th}$ frame image; and performing temporal smoothing based on the compensated predicted position information and second predicted position information of the key points in the $N^{th}$ frame image to obtain smoothed predicted position information of the key points in the $N^{th}$ frame image.

According to another aspect, this disclosure provides an apparatus for processing key points in an image, the apparatus including: a memory operable to store computer-readable instructions and a processor circuitry operable to read the computer-readable instructions. When executing the computer-readable instructions, the processor circuitry is configured to:

obtain a first image region to which key points belong in an $(N-1)^{th}$ frame image, N being an integer greater than or equal to 2;

obtain a second image region to which the key points belong in an $N^{th}$ frame image, a second position of the second image region in the $N^{th}$ frame image corresponding to a first position of the first image region in the $(N-1)^{th}$ frame image;

perform optical flow processing on the key points according to the first image region and the second image region to determine position offset information of the key points;

compensate first predicted position information of the key points in the $(N-1)^{th}$ frame image using the position offset information to obtain compensated predicted position information of the key points in the $(N-1)^{th}$ frame image; and perform temporal smoothing based on the compensated predicted position information and second predicted position information of the key points in the $N^{th}$ frame image to obtain smoothed predicted position information of the key points in the $N^{th}$ frame image.

According to another aspect, this disclosure provides a non-transitory machine-readable media, having instructions stored on the machine-readable media. When being executed, the instructions are configured to cause a machine to:

obtain a first image region to which key points belong in an $(N-1)^{th}$ frame image, N being an integer greater than or equal to 2;

obtain a second image region to which the key points belong in an $N^{th}$ frame image, a second position of the second image region in the $N^{th}$ frame image corresponding to a first position of the first image region in the $(N-1)^{th}$ frame image;

perform optical flow processing on the key points according to the first image region and the second image region to determine position offset information of the key points;

compensate first predicted position information of the key points in the $(N-1)^{th}$ frame image using the position offset information to obtain compensated predicted position information of the key points in the $(N-1)^{th}$ frame image; and perform temporal smoothing based on the compensated predicted position information and second predicted position information of the key points in the $N^{th}$ frame image to obtain smoothed predicted position information of the key points in the $N^{th}$ frame image.

It can be seen from the disclosure that, a first image region to which the key points belong in an $(N-1)^{th}$ frame image is obtained, N being an integer greater than or equal to 2; a second image region to which the key points belong in an $N^{th}$ frame image is obtained, a second position of the second image region in the $N^{th}$ frame image corresponding to a first position of the first image region in the $(N-1)^{th}$ frame image; optical flow of the key points between the first image region and the second image region is analyzed to determine position offset information of the key points; first predicted position information of the key points in the $(N-1)^{th}$ frame image is compensated by using the position offset information to obtain compensated predicted position information of the key points in the $(N-1)^{th}$ frame image; and temporal smoothing is performed on the second predicted position information of the key points in the $N^{th}$ frame image by using the compensated predicted position information to obtain smoothed predicted position information of the key points in the $N^{th}$ frame image. It can be seen that, by compensating the first predicted position information of the key points in the $(N-1)^{th}$ frame image by using the position offset information of the key points in the first image region and the second image region, the compensated predicted position information closer to the second predicted position information of the key points in the $N^{th}$ frame image is obtained, and used to perform temporal smoothing on the second predicted position information to reduce the tendency of the temporal smoothing result. Based on this, the method can effectively avoid the delay or jitter of key points in consecutive images, thereby improving the smoothing effect of the key points in the consecutive images to adapt to scenarios in which the stability of the key points in the consecutive images is highly required.

BRIEF DESCRIPTION OF THE DRAWINGS

To describe the technical solution in embodiments of this disclosure or the related art more clearly, the following briefly describes the accompanying drawings required for describing the embodiments or the related art. Apparently, the accompanying drawings in the following description show merely some embodiments of this disclosure, and a person of ordinary skill in the art may still derive other drawings from the accompanying drawings without creative efforts.

DESCRIPTION OF EMBODIMENTS

Figure 1:
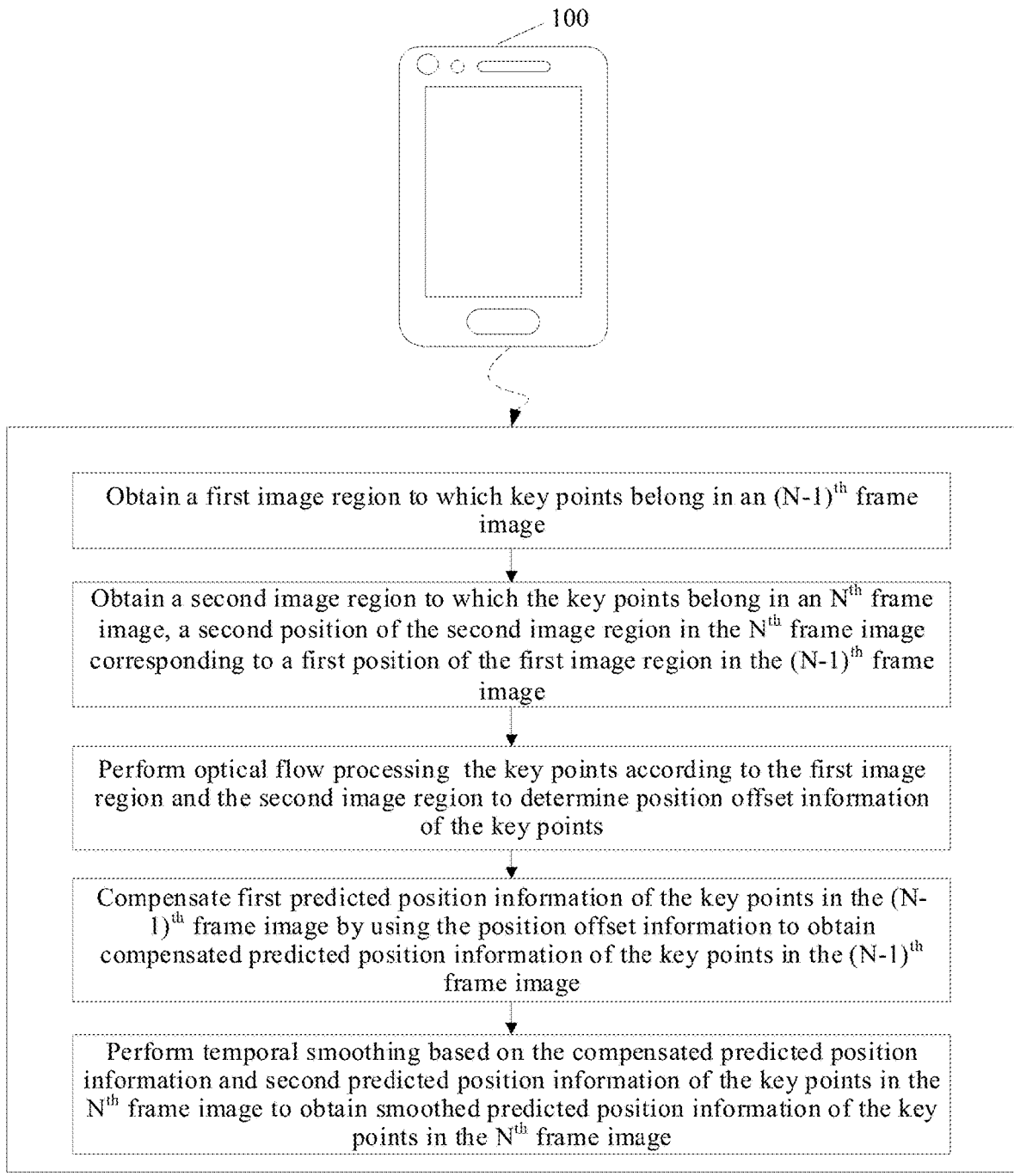
FIG. 1 is a schematic diagram of an application scenario of a method for processing key points in an image according to an embodiment of this disclosure.

The following describes the embodiments of this disclosure with reference to the accompanying drawings.

At present, when an AR technology is applied to a video, the stability of key points in consecutive images is highly required. Generally, predicted position information of key points in images is outputted by a deep learning model, but the deep learning model does not calculate a loss function based on a temporal constraint during training, and does not consider the temporality of the images, resulting in a jitter of the key points in the outputted consecutive images. In order to stabilize the key points in the outputted consecutive images, the key points in the outputted consecutive images need to be smoothed, and usually a temporal smoothing method may be adopted. The temporal smoothing method is to use the predicted position information of the key points in the previous frame image to smooth the predicted position information of the key points in the current frame image.

However, a weight may be used during temporal smoothing, and the weight herein may refer to a weight of an image frame at a different time, such as a weight of a previous frame. When the weight of the predicted position information of the key points in the previous frame image is large in the temporal smoothing method, the predicted position information after the temporal smoothing tends to be the predicted position information of the key points in the previous frame image, resulting in a delay of the key points in the consecutive images; on the contrary, when the weight of the predicted position information of the key points in the previous frame image is small, the predicted position information after the temporal smoothing tends to the predicted position information of the key points in the current frame image, resulting in a jitter of the key points in the consecutive images. Therefore, the temporal smoothing method has a poor smoothing effect on the key points in the consecutive images, and is not suitable for scenarios in which the stability of the key points in the consecutive images is highly required.

In view of this, this disclosure provides a method for processing key points in an image and a related apparatus, by compensating the first predicted position information of the key points in the $(N-1)^{th}$ frame image by using the position offset information of the key points in the first image region and the second image region, the compensated predicted position information closer to the second predicted position information of the key points in the $N^{th}$ frame image is obtained, and used to perform temporal smoothing on the second predicted position information to reduce the tendency of the temporal smoothing result. Based on this, the method can effectively avoid the delay or jitter of key points in consecutive images, thereby improving the smoothing effect of the key points in the consecutive images to adapt to scenarios in which the stability of the key points in the consecutive images is highly required.

The method for processing key points in an image provided by the embodiments of this disclosure is implemented based on artificial intelligence, and may specifically involve a computer vision (CV) technology in artificial intelligence, such as image processing, virtual reality, and AR in the CV technology, and common technologies such as key point recognition.

The method for processing key points in an image provided by the embodiments of this disclosure may be applied to a processing device for key points in an image and having a data processing capability and the processing device is a computer device, for example, may be a terminal device or a server. The terminal device may be a smartphone, a computer, a tablet computer, a laptop, a desktop computer, a smart speaker, a smart watch, a smart voice interactive device, a smart home appliance, a vehicle terminal, or the like. The server may be an independent physical server, or may be a server cluster including a plurality of physical servers or a distributed system, or may be a cloud server providing cloud computing services, but is not limited thereto. The terminal device and the server may be directly or indirectly connected in a wired or wireless communication manner, which is not limited in this disclosure. The method for processing key points in an image provided by the embodiments of this disclosure may be applied to various scenarios, including but not limited to video, cloud technology, artificial intelligence, intelligent transportation, assisted driving, and the like.

For ease of understanding the technical solutions of this disclosure, the method for processing key points in an image provided by the embodiments of this disclosure is introduced below in combination with actual application scenarios.

FIG. 1 is a schematic diagram of an application scenario of a method for processing key points in an image according to an embodiment of this disclosure. The application scenario shown in FIG. 1 includes a terminal device 100, where the terminal device 100 is used as a processing device for key points in an image, and the terminal device 100 loads and runs a video application that implements an AR special effect.

The terminal device 100 may obtain consecutive images of a video, that is, an $(N-1)^{th}$ frame image and an $N^{th}$ frame image of the video, when running the video application program that implements an AR special effect. In order to ensure the aesthetics and authenticity of AR presentation in the $(N-1)^{th}$ frame image and the $N^{th}$ frame image of the video, any key point in the $(N-1)^{th}$ frame image is used as a to-be-processed key point, and the stability of key points in the $(N-1)^{th}$ frame image and the $N^{th}$ frame image is particularly important.

Based on this, the terminal device 100 outputs first predicted position information of the key points in the $(N-1)^{th}$ frame image and second predicted position information of the key points in the $N^{th}$ frame image through a deep learning model. In order to ensure the stability of the key points in the $(N-1)^{th}$ frame image and the $N^{th}$ frame image, the terminal device 100 needs to perform temporal smoothing on the second predicted position information based on the first predicted position information in the following manner.

First, the terminal device 100 needs to obtain a first image region to which the key points belong in the $(N-1)^{th}$ frame image, where N is an integer greater than or equal to 2. Correspondingly, the terminal device 100 further needs to obtain a second image region to which the key points in the $N^{th}$ frame image belongs, where a second position of the second image region in the $N^{th}$ frame image corresponds to a first position of the first image region in the $(N-1)^{th}$ frame image.

Second, the terminal device 100 may perform optical flow processing on the key points according to the first image region and the second image region to determine position offset information of the key points. That is, the terminal device 100 obtains the position offset information of the key points in the $(N-1)^{th}$ frame image and the $N^{th}$ frame image.

Then, the terminal device 100 may compensate first predicted position information of the key points in the $(N-1)^{th}$ frame image by using the position offset information to obtain compensated predicted position information of the key points in the $(N-1)^{th}$ frame image. The compensated predicted position information is closer to the second predicted position information than the first predicted position information.

Finally, the terminal device 100 performs temporal smoothing based on the compensated predicted position information and second predicted position information of the key points in the $N^{th}$ frame image to obtain smoothed predicted position information of the key points in the $N^{th}$ frame image. That is, the terminal device 100 performs temporal smoothing on the second predicted position information by replacing the first predicted position information with the compensated predicted position information closer to the second predicted position information, to reduce the tendency of the temporal smoothing result, thereby making the smoothed predicted position information more accurate.

It can be seen that, the terminal device 100 may compensate the first predicted position information of the key points in the $(N-1)^{th}$ frame image by using the position offset information of the key points in the first image region and the second image region, so that the compensated predicted position information closer to the second predicted position information of the key points in the $N^{th}$ frame image is obtained and used to perform temporal smoothing on the second predicted position information to reduce the tendency of the temporal smoothing result. Based on this, the method can effectively avoid the delay or jitter of key points in consecutive images, thereby improving the smoothing effect of the key points in the consecutive images to adapt to scenarios in which the stability of the key points in the consecutive images is highly required.

Next, the method for processing key points in an image provided by the embodiments of this disclosure is described in detail below by using a terminal device as a processing device for key points in an image.

Figure 2:
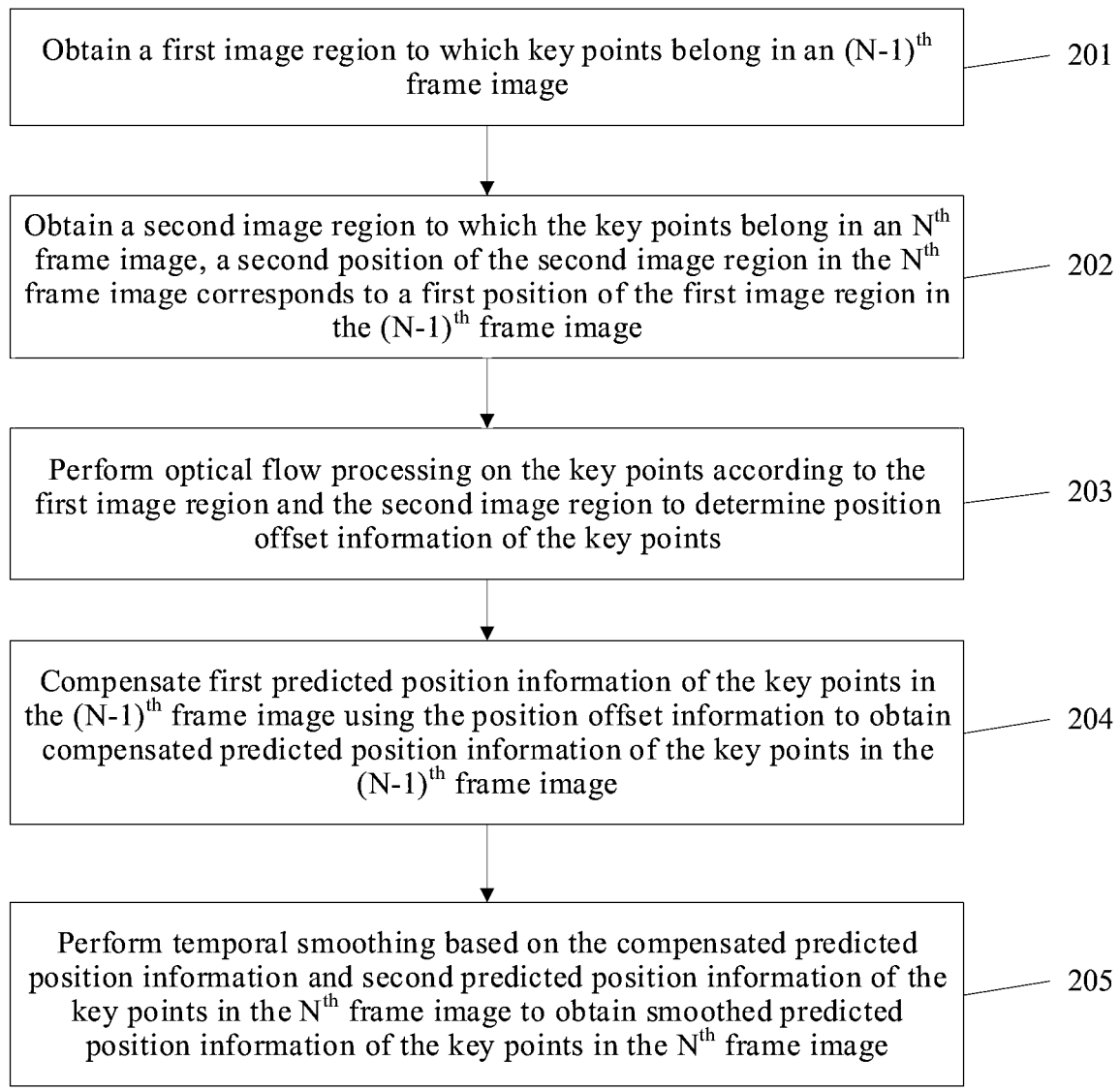
FIG. 2 is a flowchart of a method for processing key points in an image according to an embodiment of this disclosure.

FIG. 2 is a flowchart of a method for processing key points in an image according to an embodiment of this disclosure. As shown in FIG. 2, the method for processing key points in an image is performed by a terminal device, and includes the following steps:

S201: Obtain a first image region to which key points belong in an $(N-1)^{th}$ frame image, N being an integer greater than or equal to 2.

In the related art, when predicted position information of key points in images is outputted by a deep learning model, in order to stabilize the key points in the outputted consecutive images, the predicted position information of the key points in the previous frame image is usually used to perform temporal smoothing on the predicted position information of the key points in the current frame image. However, the predicted position information of the key points in the current frame image is displaced relative to the predicted position information of the key points in the previous frame image. A smaller displacement makes a larger weight of the predicted position information of the key points in the previous frame image in the temporal smoothing method, and the predicted position information after the temporal smoothing tends to be the predicted position information of the key points in the previous frame image, resulting in a delay of the key points in the consecutive images; on the contrary, a larger displacement makes a smaller weight of the predicted position information of the key points in the previous frame image, and the predicted position information after the temporal smoothing tends to the predicted position information of the key points in the current frame image, resulting in a jitter of the key points in the consecutive images. That is, it is difficult to adjust proper weights to address the problem of the delay or jitter of the key points in the consecutive images.

In this embodiment of this disclosure, in order to address the problem of the delay or jitter of the key points in the consecutive images caused by the temporal smoothing method, it is considered to compensate the predicted position information of the key points in the previous frame image on the basis of the predicted position information of the key points in the previous frame image and the predicted position information of the key points in the current frame image, so that compensated predicted position information of the key points in the previous frame image is closer to the predicted position information of the key points in the current frame image, and temporal smoothing is performed on the predicted position information of the key points in the current frame image through the compensated predicted position information of the key points in the previous frame image, to reduce the tendency of the temporal smoothing result, thereby avoiding the delay or jitter of the key points in the consecutive images.

The precondition of compensating the predicted position information of the key points in the previous frame image is to analyze optical flow of the key points between an image region to which the key points belong in the previous frame image and an image region to which the key points belong in the current frame image, to obtain position offset information of the key points. Therefore, in this embodiment of this disclosure, the $(N-1)^{th}$ frame image is used to represent the previous frame image, the $N^{th}$ frame image is used to represent the current frame image, any key point in the $(N-1)^{th}$ frame image is used as a to-be-processed key point, and a first image region to which key points belong needs to be first obtained from the $(N-1)^{th}$ frame image.

During specific implementation of S201, on the basis of obtaining the first predicted position information of the key points in the $(N-1)^{th}$ frame image, the first image region to which the key points belong needs to be determined and obtained in the $(N-1)^{th}$ frame image based on the first predicted position information of the key points. Therefore, this disclosure provides an exemplary implementation, and S201, for example, may include: Obtain a first image region from the $(N-1)^{th}$ frame image based on the first predicted position information. In this way, the first image region can be determined more accurately.

S202: Obtain a second image region to which the key points belong in an $N^{th}$ frame image, a second position of the second image region in the $N^{th}$ frame image corresponding to a first position of the first image region in the $(N-1)^{th}$ frame image.

In this embodiment of this disclosure, after the first image region to which the key points belong in the $(N-1)^{th}$ frame image is obtained in S201, corresponding to the first position of the first image region in the $(N-1)^{th}$ frame image, the second image region to which the key points belong further needs to be obtained from the Nth frame image according to the first position.

Figure 3:
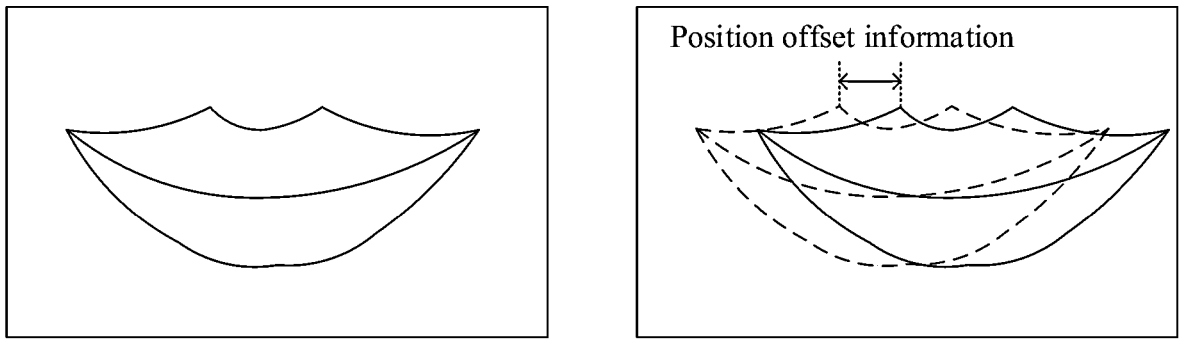
FIG. 3 is a schematic diagram of a first image region and a second image region according to an embodiment of this disclosure.

Corresponding to the implementation of S201, during specific implementation of S202, in order to ensure that the second position of the second image region in the $N^{th}$ frame image corresponds to the first position of the first image region in the $(N-1)^{th}$ frame image, the second image region to which the key points belong still needs to be determined and obtained in the $N^{th}$ frame image based on the first predicted position information of the key points in the $(N-1)^{th}$ frame image. Therefore, this disclosure provides an exemplary implementation, and S202, for example, may include: Obtain a second image region from the $N^{th}$ frame image based on first predicted position information. In this way, it can be ensured that the first image region corresponds to the second image region, thereby improving the accuracy of subsequent optical flow processing. As an example, FIG. 3 is a schematic diagram of a first image region and a second image region. The key points being mouth key points are used as an example for description. The first image region may be shown in the left figure in FIG. 3, and the second image region may be shown in the right figure in FIG. 3. The first image region is obtained from an $(N-1)^{th}$ frame face image based on first predicted position information of the mouth key points in the $(N-1)^{th}$ frame face image; and the second image region is obtained from an $N^{th}$ frame face image based on the first predicted position information of the mouth key points in the $(N-1)^{th}$ frame face image.

That the second position of the second image region in the $N^{th}$ frame image corresponds to the first position of the first image region in the $(N-1)^{th}$ frame image may mean that a coincidence degree between the first position and the second position reaches a preset threshold, and in this case, the first position and the second position may be completely coincident or partially coincident. For example, if the preset threshold value is 95%, the coincidence degree between the first position and the second position is greater than or equal to 95%.

S203: Perform optical flow processing on the key points according to the first image region and the second image region to determine position offset information of the key points.

In this embodiment of this disclosure, after the first image region and the second image region are obtained in S201 to S202, optical flow of the key points between the first image region and the second image region needs to be analyzed to determine the position offset information of the key points in the first image region and the second image region. The position offset information may refer to an offset of the key points between two frames of images, and therefore the position offset information may be used to compensate the first predicted position information of the key points in the $(N-1)^{th}$ frame image, so that the compensated first predicted position information is closer to the second predicted position information of the key points in the $N^{th}$ frame image.

The optical flow refers to apparent motion of a corresponding brightness mode on an observation imaging plane when an object is moving, that is, an instantaneous velocity of pixel motion of a spatial moving object on the observation imaging plane. The optical flow processing may be used to find a relationship between the current frame image and the previous frame image by using a change of pixels in a time domain and a correlation between adjacent frames in an image sequence, to calculate a position change of pixels (the pixels herein are key points as an example) between two frames of images. Based on the effect of optical flow processing, in this embodiment of this disclosure, optical flow processing is performed on the key points according to the first image region and the second image region. For example, a displacement of the first image region relative to the second image region may be calculated, to obtain the position change of the key points between the two frames of images, that is, position offset information. Referring to FIG. 3, in order to help reflect the position offset information in FIG. 3, the first image region is represented by a dotted line in the right figure of FIG. 3, and the position offset information may be shown in the right figure of FIG. 3. During specific implementation of S203, on the basis that the key points in the second image region is obtained after a time interval of the key points from the $(N-1)^{th}$ frame image to the $N^{th}$ frame image in the first image region, first, optical flow of the key points between the first image region and the second image region may be analyzed based on an optical flow method, that is, optical flow processing is performed on the key points in the first image region and the second image region, to obtain an optical flow vector that represents an instantaneous velocity of the key points through calculation. Then, the position offset information of the key points in the first image region and the second image region may be obtained through calculation according to the optical flow vector that represents the instantaneous velocity of the key points. Therefore, this disclosure provides an exemplary implementation, and S203, for example, may include: the following S2031 to S2032:

S2031: Perform optical flow processing on the key points in the first image region and the key points in the second image region to obtain an optical flow vector of the key points, where the optical flow vector represents an instantaneous velocity of the key points.

During specific implementation of S2031, first, it may be based on two basic assumptions followed by the optical flow method: One pixel changes with time, its brightness value, that is, pixel grayscale value is constant, and the change of time does not cause a drastic position change. That is, optical flow processing is performed on the key points in the first image region and the second image region, and based on the fact that the pixel gray value of the key points in the first image region and the second image region is constant, and the position of the key points in the first image region and the second image region does not change drastically, a first relation between the optical flow vector of the key points and an image gradient based on the key points may be obtained.

Then, an additional assumption is introduced: surrounding pixels of one pixel have similar motion with the pixel. That is, on the basis that both the first image region and the second image region include the key points and surrounding pixels of the key points, based on the fact that surrounding pixels of the key points have similar motion to the to-be-processed key point, it is equivalent to obtaining a second relation between the optical flow vector of the key points and an image gradient based on the surrounding pixels.

Finally, for the first relation and the second relation, on the basis that the image gradient based on the key points and the image gradient based on the surrounding pixels may be obtained from the second image region, the first relation and the second relation are solved, to obtained the optical flow vector that represents the key points through calculation. Therefore, this disclosure provides an exemplary implementation in which both the first image region and the second image region include key points and surrounding pixels of the key points; and correspondingly, S2031, for example, may include the following S1 to S3:

S1: Perform optical flow processing on the key points in the first image region and the key points in the second image region to determine a first relation between the optical flow vector and an image gradient based on the key points.

S2: Determine a second relation between the optical flow vector and an image gradient based on the surrounding pixels based on the first relation.

The surrounding pixels of the key points may be m×m pixels around the to-be-processed key point, m is an integer greater than or equal to 3, and the m×m pixels, for example, may be 3×3 pixels or 5×5 pixels. considering adjacent pixels of the key points, that is, the 3×3 pixels around the key points have similar motion to the key points, and based on the first relation, the second relation between the optical flow vector and the image gradient based on adjacent pixels is determined, and a quantity of the second relations is the least, which can greatly reduce the calculation amount of the subsequent solution. Therefore, this disclosure provides an exemplary implementation in which the surrounding pixels include adjacent pixels of the key points; and S2, for example, may include: Determine a second relation between the optical flow vector and an image gradient based on adjacent pixels based on the first relation.

S3: Solve the first relation and the second relation to obtain the optical flow vector.

Since the surrounding pixels of the key points have similar motion to the key points, in this embodiment of this disclosure, the accuracy of the optical flow vector can be improved by calculating the optical flow vector of the to-be-processed pixels in combination with the surrounding pixels.

Generally, if the $(N-1)^{th}$ frame image and the $N^{th}$ frame image in the video are two-dimensional images, the first image region and the second image region are also two-dimensional images, and correspondingly, the optical flow vector of the key points may be a two-dimensional vector that represents an instantaneous velocity of the to-be-processed key point, that is, a first instantaneous velocity component of the key points in an x-axis direction and a second instantaneous velocity component in a y-axis direction. Therefore, this disclosure provides an exemplary implementation in which the optical flow vector includes a first instantaneous velocity component of the key points in an x-axis direction and a second instantaneous velocity component in a y-axis direction, thereby obtaining an optical flow vector suitable for key point processing in a two-dimensional image to be applied to a corresponding application scenario.

As an example, on the basis of the Lucas Kanade optical flow method (LK optical flow method), assuming that the key points in the first image region is represented as I(x, y, t), after a time interval dt from the $(N-1)^{th}$ frame image to the $N^{th}$ frame image, the key points in the first image region is represented as I($x+dx, y+dy, t+dt$), and based on the constant pixel grayscale value of the key points in the first image region and the second image region, it may be obtained that:

$$I(x,y,t)=I(x+dx,y+dy,t+dt)$$

Based on the fact that the position of the key points in the first image region and the key points in the second image region does not change dramatically, Taylor expansion may be adopted on the right side of the above formula to obtain:

$$I(x, y, t) = 1(x, y, t) + \frac{\partial I}{\partial x}dx + \frac{\partial I}{\partial y}dy + \frac{\partial I}{\partial t}dt + \varepsilon$$

$\varepsilon$ represents the second-order infinitesimal, which may be ignored, and the following equation is obtained after sorting:

$$\frac{\partial I}{\partial x}\frac{dx}{dt} + \frac{\partial I}{\partial y}\frac{dy}{dt} + \frac{\partial I}{\partial t} = 0$$

Let $\frac{\partial I}{\partial x} = I_x, \frac{\partial I}{\partial y} = I_y, \frac{\partial I}{\partial t} = I_t, \frac{dx}{dt} = u,$ and $\frac{dy}{dt} = v,$ it may be obtained that:

$$I_x u + I_y v + I_t = 0$$

$I_x$ is the image gradient along the x-axis direction, $I_y$ is the image gradient along the y-axis direction, $I_t$ is the gradient along time, (u, v) is the optical flow vector of the to-be-processed key point, u is the first instantaneous velocity component of the key points in the x-axis direction, and v is the second instantaneous velocity component of the key points in the y-axis direction.

In the above formula, both u and v are unknowns. If one relation cannot solve two unknowns, based on the fact that the adjacent pixels of the key points, that is, the 3×3 pixels around the to-be-processed key point, have similar motion to the to-be-processed key point, it may be obtained that:

$$\begin{bmatrix} I_{x1} & I_{y1} \\ I_{x2} & I_{y2} \\ \vdots & \vdots \\ I_{x9} & I_{y9} \end{bmatrix} \begin{bmatrix} u \\ v \end{bmatrix} = \begin{bmatrix} -I_{t1} \\ -I_{t2} \\ \vdots \\ -I_{t3} \end{bmatrix}$$

(u, v) may be solved by a least square method, to obtain:

$$\begin{bmatrix} u \\ v \end{bmatrix} = \begin{bmatrix} \sum_i I_{xi}^2 & \sum_i I_{xi}I_{yi} \\ \sum_i I_{xi}I_{yi} & \sum_i I_{yi}^2 \end{bmatrix} \begin{bmatrix} -\sum_i I_{xi}I_{ti} \\ -\sum_i I_{yi}I_{ti} \end{bmatrix}$$

Certainly, in addition to the above LK optical flow method, other optical flow methods such as Fast Optical Flow using Dense Inverse Search (DIS optical flow method) may also be used. However, compared with other optical flow methods, the LK optical flow method is faster and better in calculating the optical flow vector.

S2032: Determine the position offset information based on the optical flow vector.

When the time interval from the $(N-1)^{th}$ frame image to the $N^{th}$ frame image is small, the optical flow vector of the key points obtained by solving is equal to the position offset information of the key points in the first image region and the second image region.

S204: Compensate first predicted position information of the key points in the $(N-1)^{th}$ frame image by using the position offset information to obtain compensated predicted position information of the key points in the $(N-1)^{th}$ frame image.

In this embodiment of this disclosure, after the position offset information of the key points is determined in S203, the first predicted position information of the key points in the $(N-1)^{th}$ frame image may be compensated by using the position offset information, to obtain the compensated first predicted position information as the compensated predicted position information of the key points. The compensation herein is actually motion compensation, and the motion compensation is a method for describing the difference between adjacent frames (such as the previous frame image and the current frame image), specifically for describing how the key points in the previous frame image moves to the corresponding position in the current frame image. That is, in this embodiment of this disclosure, the first predicted position information may be compensated by using the position offset information, to obtain the compensated first predicted position information, that is, the compensated predicted position information. Since the key points in the previous frame image may be moved to the corresponding position in the current frame image through compensation, the compensated predicted position information of the key points is closer to the second predicted position information of the key points in the $N^{th}$ frame image than the first predicted position information of the key points in the $(N-1)^{th}$ frame image. In an exemplary implementation, the method for compensating the first predicted position information by using the position offset information may be adding the position offset information to the first predicted position information to obtain the compensated predicted position information.

S205: Perform temporal smoothing based on the compensated predicted position information and second predicted position information of the key points in the $N^{th}$ frame image to obtain smoothed predicted position information of the key points in the $N^{th}$ frame image.

In this embodiment of this disclosure, after the compensated predicted position information of the key points is obtained in S204, temporal smoothing is performed on the second predicted position information of the key points in the $N^{th}$ frame image by replacing the first predicted position information of the key points in the $(N-1)^{th}$ frame image with the compensated predicted position information. On the basis that the compensated predicted position information of the key points is closer to the second predicted position information of the key points in the $N^{th}$ frame image, the tendency of the temporal smoothing result can be reduced, to effectively avoid the delay or jitter of the key points in the consecutive images.

The temporal smoothing may mean smoothing the predicted position information of the key points in the current frame image by using the predicted position information of the key points in the previous frame image (for example, key points). The position information of the key points in the $N^{th}$ frame image obtained by the temporal smoothing may be referred to as the smoothed predicted position information, that is, the smoothed predicted position information is obtained by performing temporal smoothing on the second predicted position information.

In an exemplary implementation, the temporal smoothing may be weighting by using the position information of the key points in the previous frame image and the position information of the key points in the current frame image. When the compensation is completed, the position information of the key points in the previous frame image may be the compensated predicted position information, and the position information of the key points in the current frame image may be the second predicted position information. Based on this, during specific implementation of S205, first, a first weight corresponding to the compensated predicted position information of the key points and a second weight corresponding to the second predicted position information of the key points in the $N^{th}$ frame image need to be determined to implement the temporal smoothing. The first weight is determined by the first predicted position information of the key points in the $(N-1)^{th}$ frame image, the second predicted position information of the key points in the $N^{th}$ frame image, and the position offset information of the key points, and the second weight is determined by the first weight. Therefore, this disclosure provides an exemplary implementation, and S205, for example, may include the following S2051 to S2053:

S2051: Determine a first weight corresponding to the compensated predicted position information based on the first predicted position information, the second predicted position information, and the position offset information.

During specific implementation of step S2051, first, a difference between the second predicted position information and the first predicted position information is calculated to obtain predicted position difference information of the key points; and then, the first weight corresponding to the compensated predicted position information of the key points is calculated according to the predicted position difference information and the position offset information of the key points in combination with a preset parameter. Therefore, this disclosure provides an exemplary implementation, and S2051, for example, may include the following S4 to S5:

S4: Obtain predicted position difference information of the key points based on the first predicted position information and the second predicted position information.

S5: Determine the first weight based on the predicted position difference information, the position offset information, and a preset parameter.

In this embodiment of this disclosure, during determining of the first weight, both the position offset information obtained based on optical flow processing and the predicted position difference information directly determined based on the predicted position information corresponding to the key points in two frames are considered, to reflect the position change of the key points between the two frames from different angles, so that the determined first weight is more moderate and the tendency of the temporal smoothing result is reduced.

S2052: Determine a second weight corresponding to the second predicted position information based on the first weight.

In actual application, a sum of the first weight and the second weight is 1.

S2053: Perform temporal smoothing based on the first weight, the compensated predicted position information, the second weight, and the second predicted position information to obtain the smoothed predicted position information.

In actual application, the formula used in S205 for temporal smoothing is as follows:

$$P'_T = w(\Delta P + \Delta uv) \times (P_{T-1} + \Delta uv) + [1 - w(\Delta P + \Delta uv)] \times P_T$$

-continued
$$w(\Delta P + \Delta uv) = \exp\left(-\frac{(\Delta P + \Delta uv)/Norm}{\alpha}\right)$$

If $P_{T-1}$ represents the first predicted position information of the key points in the $(N-1)^{th}$ frame image, and $\Delta uv$ represents the position offset information of the to-be-processed key point, $P_{T-1}+\Delta uv$ represents the compensated predicted position information of the to-be-processed key point, and $w(\Delta P+\Delta uv)$ represents the first weight; and $P_T$ represents the second predicted position information of the key points in the $N^{th}$ frame image, and $1-w(\Delta P+\Delta uv)$ represents the second weight.

In this embodiment of this disclosure, during determining of the first weight and the second weight, the position offset information obtained based on the optical flow processing is t considered, so that the determined first weight and second weight are more balanced and moderate, and the tendency of the temporal smoothing result is reduced.

In addition, for a video test set including consecutive images, an accuracy index-Normalization Mean Error (NME) value and a stability index-Mean Landmark Stability Error (MLSE) value obtained through calculation based on smoothed predicted position information of key points and actual position information of the key points by adopting the method for processing key points in an image provided by this embodiment of this disclosure compared with a temporal smoothing method of key points in an image in the related art are shown in the following table:

TABLE

| NME value and MLSE value | | |
|---|---|---|
| Method | NME | MLSE |
| Temporal smoothing method of key points in an image in the related art | 0.0259 | 0.00800 |
| Method for processing key points in an image provided by this embodiment of this disclosure | 0.0256 | 0.00788 |

Compared with the temporal smoothing method of key points in an image in the related art, in the method for processing key points in an image provided by this embodiment of this disclosure in the table, both the NME value and the MLSE value obtained through calculation are reduced, indicating that the method for processing key points in an image provided by this embodiment of this disclosure can effectively avoid the delay or jitter of the key points in the consecutive images compared with the temporal smoothing method of key points in an image in the related art, thereby improving the smoothing effect of the key points in the consecutive images.

In the method for processing key points in an image provided by the above embodiments, a first image region to which the key points belong in an $(N-1)^{th}$ frame image is obtained, N being an integer greater than or equal to 2; a second image region to which the key points belong in an $N^{th}$ frame image is obtained, a second position of the second image region in the $N^{th}$ frame image corresponding to a first position of the first image region in the $(N-1)^{th}$ frame image; optical flow of the key points between the first image region and the second image region is analyzed to determine position offset information of the key points; first predicted position information of the key points in the $(N-1)^{th}$ frame image is compensated by using the position offset information to obtain compensated predicted position information of the key points in the $(N-1)^{th}$ frame image; and temporal smoothing is performed on the second predicted position information of the key points in the $N^{th}$ frame image by using the compensated predicted position information to obtain smoothed predicted position information of the key points in the $N^{th}$ frame image. It can be seen that, by compensating the first predicted position information of the key points in the $(N-1)^{th}$ frame image by using the position offset information of the key points in the first image region and the second image region, the compensated predicted position information closer to the second predicted position information of the key points in the $N^{th}$ frame image is obtained, and used to perform temporal smoothing on the second predicted position information to reduce the tendency of the temporal smoothing result. Based on this, the method can effectively avoid the delay or jitter of key points in consecutive images, thereby improving the smoothing effect of the key points in the consecutive images to adapt to scenarios in which the stability of the key points in the consecutive images is highly required.

Figure 4:
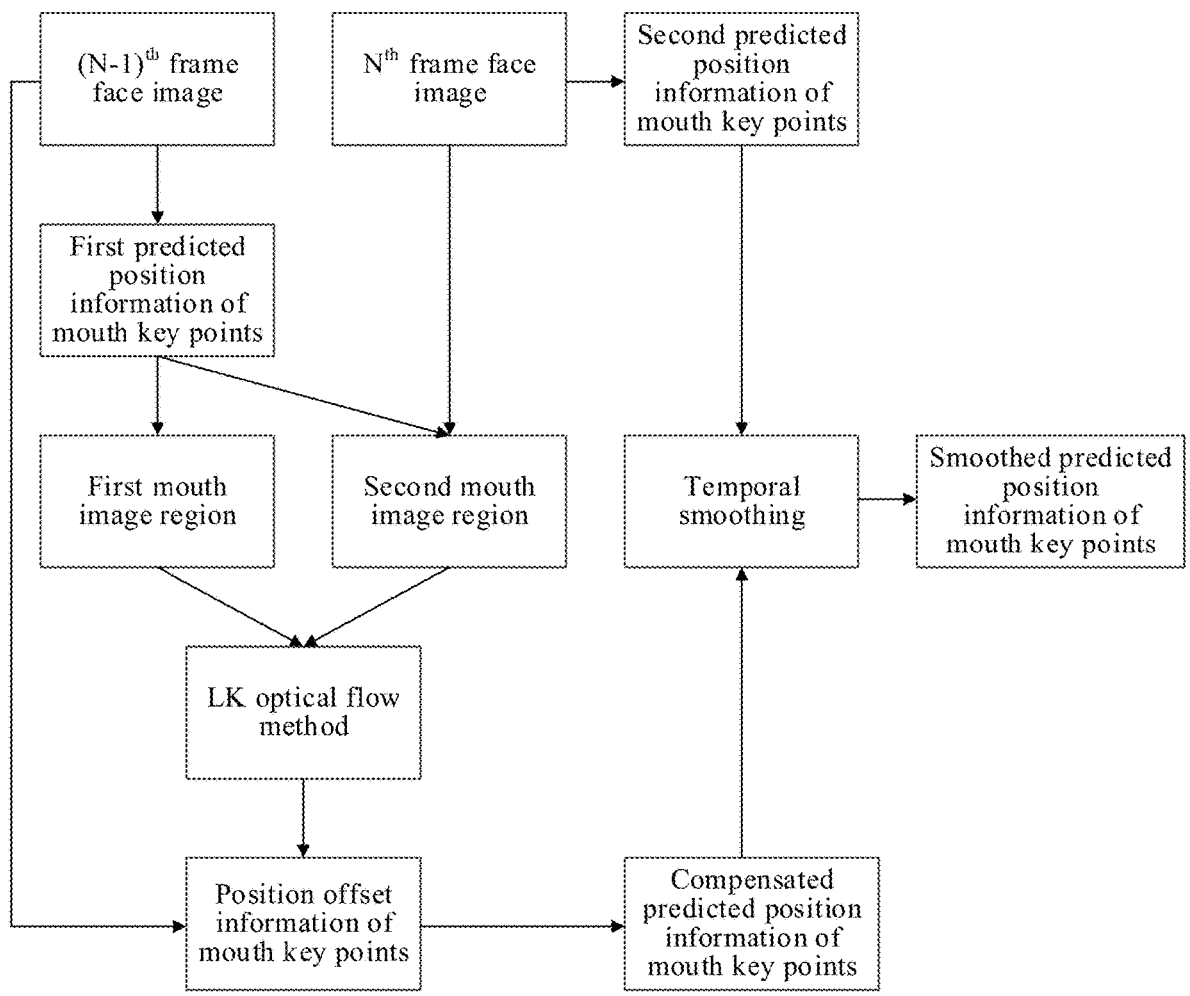
FIG. 4 is a specific schematic flowchart of a method for processing key points in an image in combination with a specific application scenario according to an embodiment of this disclosure.

Next, FIG. 4 is a specific schematic flowchart of a method for processing key points in an image in combination with a specific application scenario. The method for processing key points in an image provided by this embodiment of this disclosure is described in detail by using a terminal device as a processing device for key points in an image.

First, first predicted position information of mouth key points is obtained for an $(N-1)^{th}$ frame face image, and a first mouth image region is obtained from the $(N-1)^{th}$ frame face image based on the first predicted position information. In addition, a second mouth image region needs to be obtained from an $N^{th}$ frame face image based on the first predicted position information.

Second, perform optical flow processing is performed on the mouth key points in the first mouth image region and the second mouth image region based on the LK optical flow method, to obtain an optical flow vector of the mouth key point; and position offset information of the mouth key points is determined based on the optical flow vector.

Then, the first predicted position information of the mouth key points in the $(N-1)^{th}$ frame face image is compensated by using the position offset information of the mouth key points, to obtain compensated predicted position information of the mouth key points.

Finally, temporal smoothing is performed based on the compensated predicted position information of the mouth key points and second predicted position information of the mouth key points in the $N^{th}$ frame face image to obtain smoothed predicted position information of the mouth key points in the $N^{th}$ frame face image.

Figure 5:
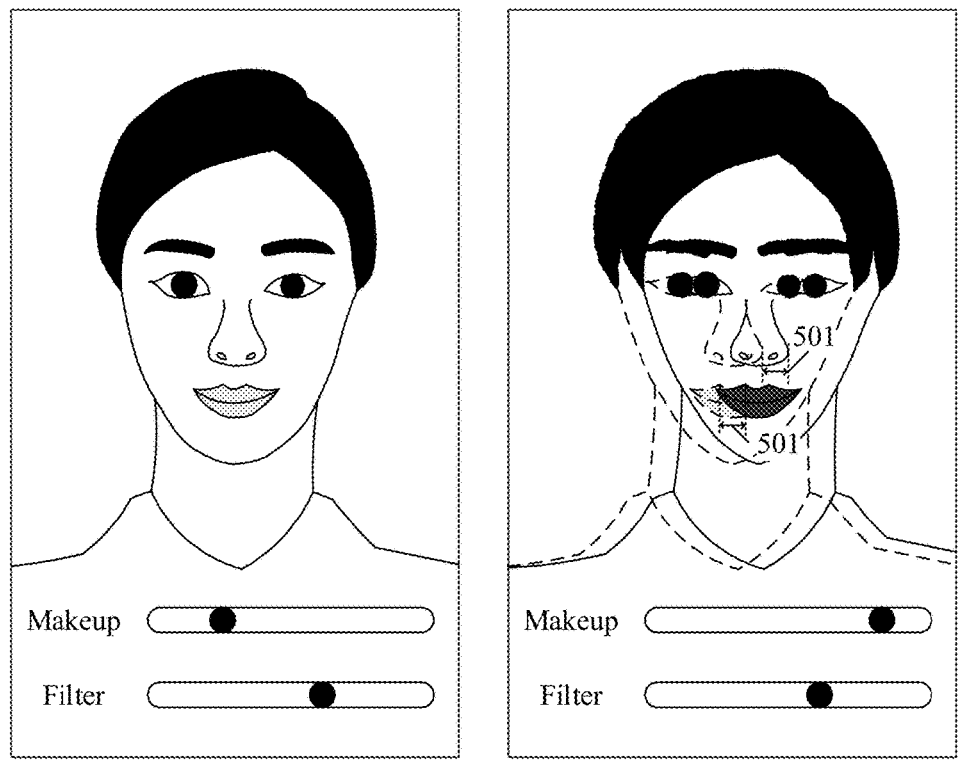
FIG. 5 is a schematic scenario diagram of makeup for consecutive face images in a video provided by an embodiment of this disclosure.

The method for processing key points in an image provided by this embodiment of this disclosure is suitable for scenarios in which the stability of key points in consecutive images is highly required, for example, scenarios to which an AR technology is applied such as a video editing application, a short video application, and a video call application running on a terminal device. FIG. 5 is a schematic scenario diagram of makeup for consecutive face images in a video. Key points being face key points in face images are used as an example, where the image shown on the left side of FIG. 5 may be used as an $(N-1)^{th}$ frame face image, and the image shown on the right side of FIG. 5 may be used as an $N^{th}$ frame face image. A first image region of the face key points in the $(N-1)^{th}$ frame face image and a second image region of the face key points in the $N^{th}$ frame face image are obtained. Second, according to the first image region and the second image region, optical flow processing is performed on the face key points by the LK optical flow method to obtain an optical flow vector of the face key point, and then position offset information of the face key points is determined based on the optical flow vector. In order to reflect the position offset information, the first image region may be represented in the form of a dotted line on the right side of FIG. 5, and in this case, the position offset information may be shown in 501 on the right side of FIG. 5. Then, first predicted position information of the face key points in the $(N-1)^{th}$ frame face image is compensated by using the position offset information of the face key points to obtain compensated predicted position information of the face key points. Finally, temporal smoothing is performed based on the compensated predicted position information of the face key points and second predicted position information of the face key points in the $N^{th}$ frame face image to obtain smoothed predicted position information of the face key points in the $N^{th}$ frame face image.

The method for processing key points in an image provided by this embodiment of this disclosure is adopted to ensure the stability of face key points in consecutive face images.

For the method for processing key points in an image provided by the above embodiments, an embodiment of this disclosure further provides an apparatus for processing key points in an image.

Figure 6:
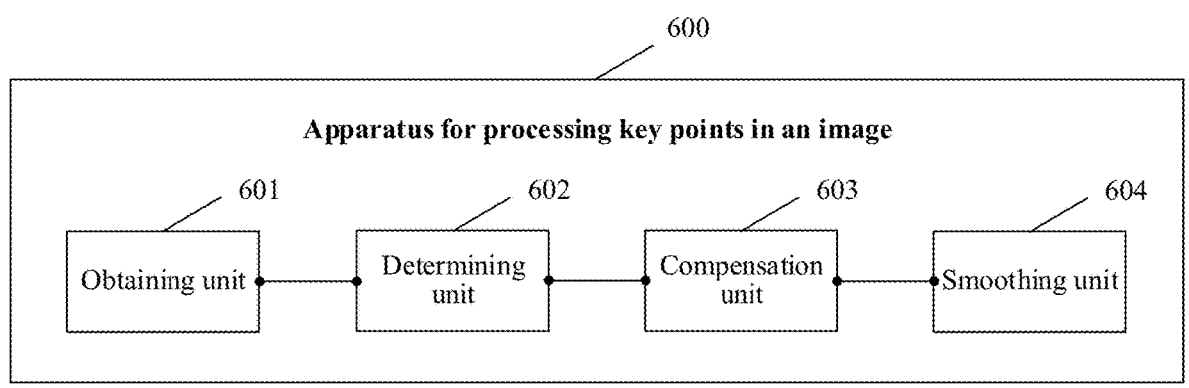
FIG. 6 is a schematic diagram of an apparatus for processing key points in an image according to an embodiment of this disclosure.

FIG. 6 is a schematic diagram of an apparatus for processing key points in an image according to an embodiment of this disclosure. As shown in FIG. 6, the apparatus 600 for processing key points in an image includes an obtaining unit 601, a determining unit 602, a compensation unit 603, and a smoothing unit 604.

The obtaining unit 601 is configured to obtain a first image region to which the key points belong in an $(N-1)^{th}$ frame image, N being an integer greater than or equal to 2.

The obtaining unit 601 is further configured to obtain a second image region to which the key points belong in an $N^{th}$ frame image, a second position of the second image region in the $N^{th}$ frame image corresponding to a first position of the first image region in the $(N-1)^{th}$ frame image.

The determining unit 602 is configured to perform optical flow processing on the key points according to the first image region and the second image region to determine position offset information of the key points.

The compensation unit 603 is configured to compensate first predicted position information of the key points in the $(N-1)^{th}$ frame image by using the position offset information to obtain compensated predicted position information of the key points in the $(N-1)^{th}$ frame image.

The smoothing unit 604 is configured to perform temporal smoothing based on the compensated predicted position information and second predicted position information of the key points in the $N^{th}$ frame image to obtain smoothed predicted position information of the key points in the $N^{th}$ frame image.

As an exemplary implementation, the smoothing unit 604 is configured to:
determine a first weight corresponding to the compensated predicted position information based on the first predicted position information, the second predicted position information, and the position offset information;
determine a second weight corresponding to the second predicted position information based on the first weight; and
perform temporal smoothing based on the first weight, the compensated predicted position information, the second weight, and the second predicted position information to obtain the smoothed predicted position information.

As an exemplary implementation, the smoothing unit 604 is configured to:
obtain predicted position difference information of the key points based on the first predicted position information and the second predicted position information; and
determine the first weight based on the predicted position difference information, the position offset information, and a preset parameter.

As an exemplary implementation, the determining unit 602 is configured to:
perform optical flow processing on the key points in the first image region and the key points in the second image region to obtain an optical flow vector of the key points, where the optical flow vector represents an instantaneous velocity of the key points; and
determine the position offset information based on the optical flow vector.

As an exemplary implementation, the first image region and the second image region both include the key points and surrounding pixels of the key points; and the determining unit 602 is configured to:
perform optical flow processing on the key points in the first image region and the key points in the second image region to determine a first relation between the optical flow vector and an image gradient based on the key points;
determine a second relation between the optical flow vector and an image gradient based on the surrounding pixels based on the first relation; and
solve the first relation and the second relation to obtain the optical flow vector.

As an exemplary implementation, the surrounding pixels include adjacent pixels of the key points.

As an exemplary implementation, the optical flow vector includes a first instantaneous velocity component in an x-axis direction and a second instantaneous velocity component in a y-axis direction of the key points.

As an exemplary implementation, the obtaining unit 601 is configured to:
obtain the first image region from the $(N-1)^{th}$ frame image based on the first predicted position information; and
the obtaining unit 601 is further configured to:
obtain the second image region from the $N^{th}$ frame image based on the first predicted position information.

In the apparatus for processing key points in an image provided by the above embodiments, a first image region to which the key points belong in an $(N-1)^{th}$ frame image is obtained, N being an integer greater than or equal to 2; a second image region to which the key points belong in an $N^{th}$ frame image is obtained, a second position of the second image region in the $N^{th}$ frame image corresponding to a first position of the first image region in the $(N-1)^{th}$ frame image; optical flow of the key points between the first image region and the second image region is analyzed to determine position offset information of the key points; first predicted position information of the key points in the $(N-1)^{th}$ frame image is compensated by using the position offset information to obtain compensated predicted position information of the key points in the $(N-1)^{th}$ frame image; and temporal smoothing is performed on the second predicted position information of the key points in the $N^{th}$ frame image by using the compensated predicted position information to obtain smoothed predicted position information of the key points in the $N^{th}$ frame image. It can be seen that, by compensating the first predicted position information of the key points in the $(N-1)^{th}$ frame image by using the position offset information of the key points in the first image region and the second image region, the compensated predicted position information closer to the second predicted position information of the key points in the $N^{th}$ frame image is obtained, and used to perform temporal smoothing on the second predicted position information to reduce the tendency of the temporal smoothing result. Based on this, the method can effectively avoid the delay or jitter of key points in consecutive images, thereby improving the smoothing effect of the key points in the consecutive images to adapt to scenarios in which the stability of the key points in the consecutive images is highly required.

An embodiment of this disclosure further provides a processing device for key points in an image. The processing device may be a computer device, and the computer device provided by this embodiment of this disclosure is described below from the perspective of hardware materialization.

For the method for processing key points in an image described above, an embodiment of this disclosure further provides a terminal device for processing key points in an image, to implement and apply the method for processing key points in an image in practice.

Figure 7:
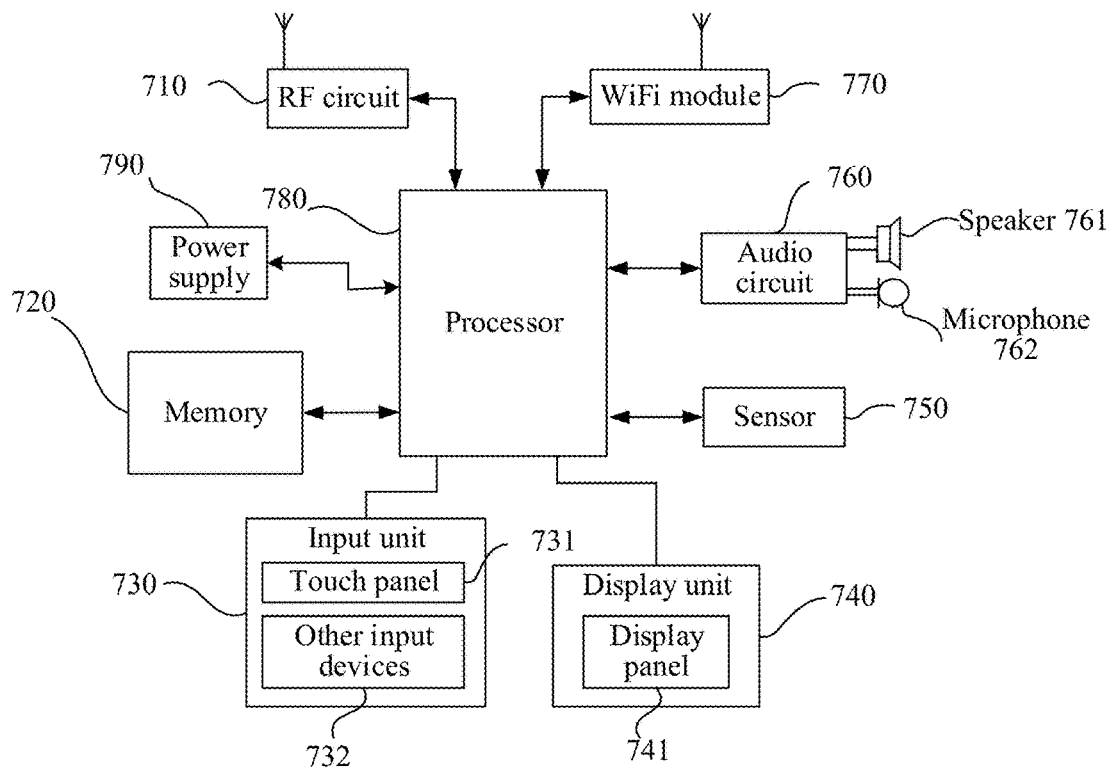
FIG. 7 is a structural schematic diagram of a terminal device according to an embodiment of this disclosure.

FIG. 7 is a schematic structural diagram of a terminal device according to an embodiment of this disclosure. For ease of description, only a part related to this embodiment of this disclosure is shown, for a specific technical detail not disclosed, refer to the method part in the embodiments of this disclosure. The terminal device may be any terminal device such as a mobile phone or a tablet computer, and the terminal device being a mobile phone is used as an example:

FIG. 7 is a block diagram of a structure of a part of a mobile phone related to a terminal device according to an embodiment of this disclosure. Referring to FIG. 7, the mobile phone includes components such as a radio frequency (RF) circuit 710, a memory 720, an input unit 730, a display unit 740, a sensor 750, an audio circuit 760, a wireless fidelity (WiFi) module 770, a processor 780, and a power supply 790. The input unit 730 may include a touch panel 731 and other input devices 732, the display unit 740 may include a display panel 741, and the audio circuit 760 may include a speaker 761 and a microphone 762. A person skilled in the art may understand that the structure of the mobile phone shown in FIG. 7 does not constitute a limitation on the mobile phone, and the mobile phone may include more components or fewer components than those shown in the figure, or some components may be combined, or a different component deployment may be used.

The term "unit" (and other similar terms such as module, submodule, etc.) refers to computing software, firmware, hardware, and/or various combinations thereof. At a minimum, however, units are not to be interpreted as software that is not implemented on hardware, firmware, or recorded on a non-transitory processor readable recordable storage medium. Indeed "unit" is to be interpreted to include at least some physical, non-transitory hardware such as a part of a processor, circuitry, or computer. Two different units can share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

The memory 720 may be configured to store a software program and module. The processor 780 runs the software program and module stored in the memory 720, to implement various functional applications and data processing of the mobile phone. The memory 720 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 720 may include a high speed RAM, and may further include a non-transitory memory, such as at least one magnetic disk storage device, a flash memory, or another solid storage device.

The processor 780 is a control center of the mobile phone, and is connected to various parts of the entire mobile phone by using various interfaces and lines. By running or executing the software program and/or the module stored in the memory 720, and invoking data stored in the memory 720, the processor executes various functions of the mobile phone and performs data processing, thereby controlling entire mobile phone. In some implementations, the processor 780 may include one or more processing units. For example, the processor 780 may integrate an application processor and a modem processor. The application processor mainly processes an operating system, a user interface, an application, and the like. The modem processor mainly processes wireless communication. It may be understood that the modem processor may either not be integrated into the processor 780.

The mobile phone further includes the power supply 790 (such as a battery) for supplying power to the components. Preferably, the power supply may be logically connected to the processor 780 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment of this disclosure, the memory 720 included in the mobile phone may store program code and transmit the program code to the processor.

The processor 780 included in the mobile phone may perform the following steps according to instructions in the program code:

obtaining a first image region to which key points belong in an $(N-1)^{th}$ frame image, N being an integer greater than or equal to 2;

obtaining a second image region to which the key points belong in an $N^{th}$ frame image, a second position of the second image region in the $N^{th}$ frame image corresponding to a first position of the first image region in the $(N-1)^{th}$ frame image;

performing optical flow processing on the key points according to the first image region and the second image region, to determine position offset information of the key points;

compensating first predicted position information of the key points in the $(N-1)^{th}$ frame image by using the position offset information to obtain compensated predicted position information of the key points in the $(N-1)^{th}$ frame image; and performing temporal smoothing based on the compensated predicted position information and second predicted position information of the key points in the $N^{th}$ frame image to obtain smoothed predicted position information of the key points in the $N^{th}$ frame image.

Figure 8:
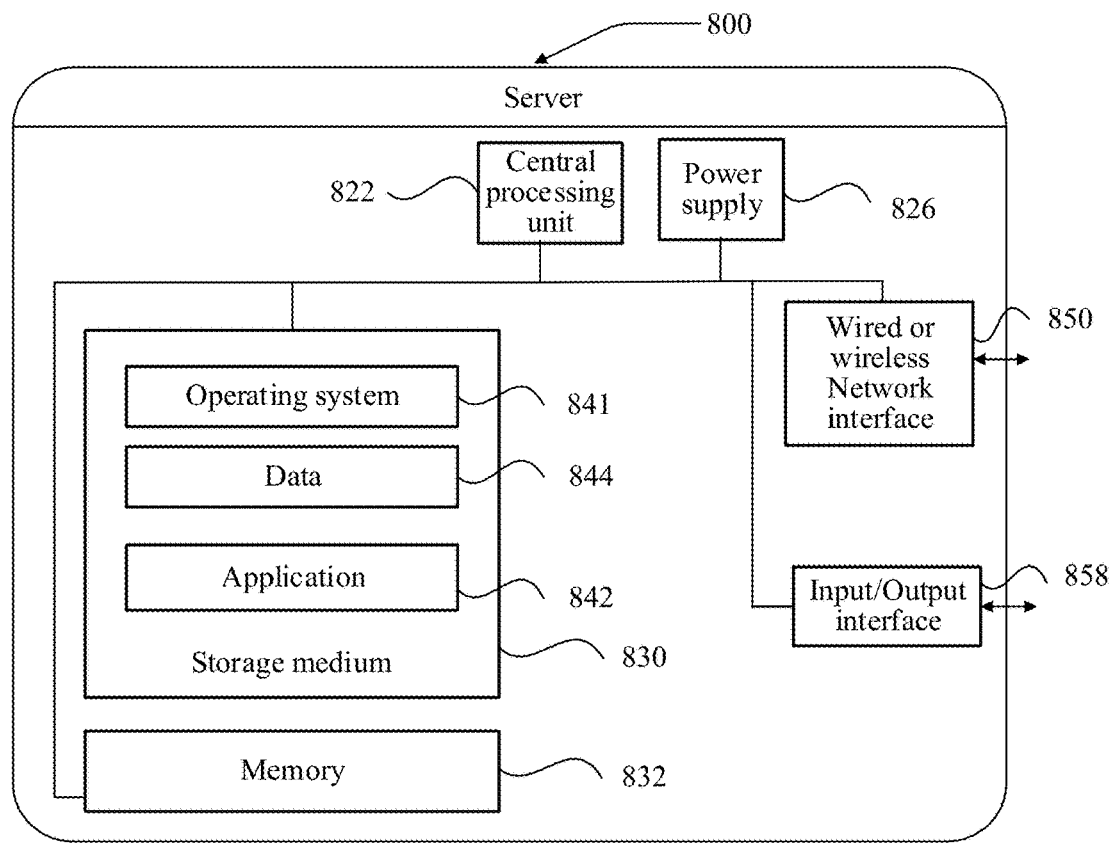
FIG. 8 is a schematic structural diagram of a server according to an embodiment of this disclosure.

FIG. 8 is a schematic structural diagram of a server according to an embodiment of this disclosure. The server 800 may vary greatly due to different configurations or performance, and may include one or more central processing units (CPU) 822 (for example, one or more processors) and a memory 832, and one or more storage medium 830 (for example, one or more mass storage devices) that store application programs 842 or data 844. The memory 832 and the storage medium 830 may be transient or persistent storages. The program stored in the storage medium 830 may include one or more modules (not marked in the figure), and each module may include a series of instruction operations to the server. Further, the CPU 822 may be configured to communicate with the storage medium 830, and execute, on the server 800, the series of instruction operations stored in the storage medium 830.

The server 800 may further include one or more power supplies 826, one or more wired or wireless network interfaces 850, one or more input/output interfaces 858, and/or one or more operating systems 841, for example, Windows Server™, Mac OS X™, Unix™, Linux™, or FreeBSD™.

The steps performed by the server in the foregoing embodiment may be based on the server structure shown in FIG. 8.

For example, the CPU 822 is configured to perform the following steps:

obtaining a first image region to which key points belong in an $(N-1)^{th}$ frame image, N being an integer greater than or equal to 2;

obtaining a second image region to which the key points belong in an $N^{th}$ frame image, a second position of the second image region in the $N^{th}$ frame image corresponding to a first position of the first image region in the $(N-1)^{th}$ frame image;

performing optical flow processing on the key points according to the first image region and the second image region to determine position offset information of the key points;

compensating first predicted position information of the key points in the $(N-1)^{th}$ frame image by using the position offset information to obtain compensated predicted position information of the key points in the $(N-1)^{th}$ frame image;

performing temporal smoothing based on the compensated predicted position information and second predicted position information of the key points in the $N^{th}$ frame image to obtain smoothed predicted position information of the key points in the $N^{th}$ frame image.

An embodiment of this disclosure further provides a computer-readable storage medium for storing a computer program, and the computer program is used to perform the method for processing key points in an image provided in the foregoing embodiments.

An embodiment of this disclosure provides a computer program product or a computer program, the computer program product or the computer program includes computer instructions, and the computer instructions are stored in a computer-readable storage medium. A processor used in a device for processing key points in an image reads the computer instructions from the computer-readable storage medium, and the processor executes the computer instructions so that the device for processing key points in an image performs the method for processing key points in an image provided in various exemplary implementations of the above aspects.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium may be at least one of the following media: any medium that can store program code, such as a read-only memory (ROM), a RAM, a magnetic disk, or an optical disc.

The embodiments in this specification are all described in a progressive manner, for same or similar parts in the embodiments, reference may be made to these embodiments, and each embodiment focuses on differences from other embodiments. Especially, device and system embodiments are basically similar to the method embodiment, and therefore is described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual requirements to implement the objectives of the solutions of the embodiments. A person of ordinary skill in the art may understand and implement the embodiments of the present disclosure without creative efforts.

The foregoing descriptions are merely a specific implementation of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for processing key points in an image, comprising:
    obtaining a first image region to which key points belong in an $(N-1)^{th}$ frame image, N being an integer greater than or equal to 2;
    obtaining a second image region to which the key points belong in an $N^{th}$ frame image, a second position of the second image region in the $N^{th}$ frame image corresponding to a first position of the first image region in the $(N-1)^{th}$ frame image;
    performing optical flow processing on the key points according to the first image region and the second image region to determine position offset information of the key points;
    compensating first predicted position information of the key points in the $(N-1)^{th}$ frame image using the position offset information to obtain compensated predicted position information of the key points in the $(N-1)^{th}$ frame image; and
    performing temporal smoothing based on the compensated predicted position information and second predicted position information of the key points in the $N^{th}$ frame image to obtain smoothed predicted position information of the key points in the $N^{th}$ frame image.

2. The method according to claim 1, wherein the performing the temporal smoothing to obtain the smoothed predicted position information of the key points in the $N^{th}$ frame image comprises:
    determining a first weight corresponding to the compensated predicted position information based on the first predicted position information, the second predicted position information, and the position offset information;
    determining a second weight corresponding to the second predicted position information based on the first weight; and
    performing temporal smoothing based on the first weight, the compensated predicted position information, the second weight, and the second predicted position information to obtain the smoothed predicted position information.

3. The method according to claim 2, wherein the determining the first weight corresponding to the compensated predicted position information comprises:
    obtaining predicted position difference information of the key points based on the first predicted position information and the second predicted position information; and
    determining the first weight based on the predicted position difference information, the position offset information, and a preset parameter.

4. The method according to claim 1, wherein the performing the optical flow processing on the key points according to the first image region and the second image region to determine the position offset information of the key points comprises:
    performing optical flow processing on the key points in the first image region and the key points in the second image region to obtain an optical flow vector of the key points, wherein the optical flow vector represents an instantaneous velocity of the key points; and
    determining the position offset information based on the optical flow vector.

5. The method according to claim 4, wherein the first image region and the second image region both comprise the key points and surrounding pixels of the key points, and the performing the optical flow processing on the key points in the first image region and the second image region to obtain the optical flow vector of the key points comprises:
    performing optical flow processing on the key points in the first image region and the key points in the second image region to determine a first relation between the optical flow vector and an image gradient of the key points;
    determining a second relation between the optical flow vector and an image gradient of the surrounding pixels based on the first relation; and
    obtaining the optical flow vector based on the first relation and the second relation.

6. The method according to claim 5, wherein the surrounding pixels comprise adjacent pixels of the key points.

7. The method according to claim 4, wherein the optical flow vector comprises a first instantaneous velocity component in an x-axis direction and a second instantaneous velocity component in a y-axis direction of the key points.

8. The method according to claim 1, wherein the obtaining the first image region to which the key points belong in the $(N-1)^{th}$ frame image comprises:
obtaining the first image region from the $(N-1)^{th}$ frame image based on the first predicted position information.

9. The method according to claim 8, wherein the obtaining the second image region to which the key points belong in the $N^{th}$ frame image comprises:
obtaining the second image region from the $N^{th}$ frame image based on the first predicted position information.

10. An apparatus for processing key points in an image, comprising:
a memory operable to store computer-readable instructions; and
a processor circuitry operable to read the computer-readable instructions, the processor circuitry when executing the computer-readable instructions is configured to:
obtain a first image region to which key points belong in an $(N-1)^{th}$ frame image, N being an integer greater than or equal to 2;
obtain a second image region to which the key points belong in an $N^{th}$ frame image, a second position of the second image region in the $N^{th}$ frame image corresponding to a first position of the first image region in the $(N-1)^{th}$ frame image;
perform optical flow processing on the key points according to the first image region and the second image region to determine position offset information of the key points;
compensate first predicted position information of the key points in the $(N-1)^{th}$ frame image using the position offset information to obtain compensated predicted position information of the key points in the $(N-1)^{th}$ frame image; and
perform temporal smoothing based on the compensated predicted position information and second predicted position information of the key points in the $N^{th}$ frame image to obtain smoothed predicted position information of the key points in the $N^{th}$ frame image.

11. The apparatus according to claim 10, wherein the processor circuitry is configured to:
determine a first weight corresponding to the compensated predicted position information based on the first predicted position information, the second predicted position information, and the position offset information;
determine a second weight corresponding to the second predicted position information based on the first weight; and
perform temporal smoothing based on the first weight, the compensated predicted position information, the second weight, and the second predicted position information to obtain the smoothed predicted position information.

12. The apparatus according to claim 11, wherein the processor circuitry is configured to:
obtain predicted position difference information of the key points based on the first predicted position information and the second predicted position information; and
determine the first weight based on the predicted position difference information, the position offset information, and a preset parameter.

13. The apparatus according to claim 10, wherein the processor circuitry is configured to:
perform optical flow processing on the key points in the first image region and the key points in the second image region to obtain an optical flow vector of the key points, wherein the optical flow vector represents an instantaneous velocity of the key points; and
determine the position offset information based on the optical flow vector.

14. The apparatus according to claim 13, wherein the first image region and the second image region both comprise the key points and surrounding pixels of the key points, and the processor circuitry is configured to:
perform optical flow processing on the key points in the first image region and the key points in the second image region to determine a first relation between the optical flow vector and an image gradient of the key points;
determine a second relation between the optical flow vector and an image gradient of the surrounding pixels based on the first relation; and
obtain the optical flow vector based on the first relation and the second relation.

15. The apparatus according to claim 14, wherein the surrounding pixels comprise adjacent pixels of the key points.

16. The apparatus according to claim 13, wherein the optical flow vector comprises a first instantaneous velocity component in an x-axis direction and a second instantaneous velocity component in a y-axis direction of the key points.

17. The apparatus according to claim 10, wherein the processor circuitry is configured to:
obtain the first image region from the $(N-1)^{th}$ frame image based on the first predicted position information.

18. The apparatus according to claim 17, wherein the processor circuitry is configured to:
obtain the second image region from the $N^{th}$ frame image based on the first predicted position information.

19. A non-transitory machine-readable media, having instructions stored on the machine-readable media, the instructions configured to, when executed, cause a machine to:
obtain a first image region to which key points belong in an $(N-1)^{th}$ frame image, N being an integer greater than or equal to 2;
obtain a second image region to which the key points belong in an $N^{th}$ frame image, a second position of the second image region in the $N^{th}$ frame image corresponding to a first position of the first image region in the $(N-1)^{th}$ frame image;
perform optical flow processing on the key points according to the first image region and the second image region to determine position offset information of the key points;
compensate first predicted position information of the key points in the $(N-1)^{th}$ frame image using the position offset information to obtain compensated predicted position information of the key points in the $(N-1)^{th}$ frame image; and
perform temporal smoothing based on the compensated predicted position information and second predicted position information of the key points in the $N^{th}$ frame image to obtain smoothed predicted position information of the key points in the $N^{th}$ frame image.

20. The non-transitory machine-readable media according to claim 19, wherein the instructions are configured to cause the machine to:

determine a first weight corresponding to the compensated predicted position information based on the first predicted position information, the second predicted position information, and the position offset information;

determine a second weight corresponding to the second predicted position information based on the first weight; and perform temporal smoothing based on the first weight, the compensated predicted position information, the second weight, and the second predicted position information to obtain the smoothed predicted position information.

\* \* \* \* \*